(12) United States Patent
Raman

(10) Patent No.: US 9,060,323 B2
(45) Date of Patent: Jun. 16, 2015

(54) AGGREGATING MULTIPLE WIRELESS CHANNELS

(71) Applicant: ARUBA NETWORKS, INC., Sunnyvale, CA (US)

(72) Inventor: Gopalakrishnan Raman, San Jose, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 0 days.

(21) Appl. No.: 14/258,203

(22) Filed: Apr. 22, 2014

(65) Prior Publication Data

US 2014/0226644 A1    Aug. 14, 2014

Related U.S. Application Data

(63) Continuation of application No. 13/011,708, filed on Jan. 21, 2011, now Pat. No. 8,705,580.

(60) Provisional application No. 61/297,679, filed on Jan. 22, 2010.

(51) Int. Cl.
*H04W 40/02* (2009.01)
*H04L 12/66* (2006.01)
*H04W 72/00* (2009.01)
*H04W 76/04* (2009.01)
*H04W 84/18* (2009.01)
*H04W 88/18* (2009.01)

(52) U.S. Cl.
CPC .............. *H04W 40/02* (2013.01); *H04L 12/66* (2013.01); *H04W 72/005* (2013.01); *H04W 76/045* (2013.01); *H04W 84/18* (2013.01); *H04W 88/18* (2013.01)

(58) Field of Classification Search
CPC .... H04L 12/66; H04W 40/02; H04W 72/005; H04W 76/045; H04W 84/18; H04W 88/18
USPC .............................. 370/338, 401, 536, 395.32
See application file for complete search history.

(56) References Cited

U.S. PATENT DOCUMENTS

| | | | |
|---|---|---|---|
| 2005/0213547 A1* | 9/2005 | Meier | 370/338 |
| 2007/0280142 A1* | 12/2007 | Meier | 370/254 |
| 2010/0215058 A1* | 8/2010 | Yakov et al. | 370/475 |
| 2010/0246396 A1* | 9/2010 | Licardie et al. | 370/232 |
| 2011/0063979 A1* | 3/2011 | Matthews et al. | 370/237 |
| 2011/0064080 A1* | 3/2011 | Hsu et al. | 370/392 |
| 2011/0085570 A1* | 4/2011 | Kotha et al. | 370/419 |
| 2011/0110369 A1* | 5/2011 | Shiraki | 370/389 |
| 2011/0128892 A1* | 6/2011 | Tallet et al. | 370/256 |
| 2011/0314129 A1* | 12/2011 | Rezaiifar et al. | 709/218 |
| 2012/0026878 A1* | 2/2012 | Scaglione | 370/235 |
| 2012/0182872 A1* | 7/2012 | Wakumoto | 370/235 |

* cited by examiner

*Primary Examiner* — Brian D Nguyen
(74) *Attorney, Agent, or Firm* — Ying Wang

(57) ABSTRACT

Extending wired networks by aggregating multiple wireless links. Multiple wireless links are used to bridge wired networks, such as wired Ethernet networks. Each wireless link applies a hash function to the destination MAC address of presented traffic and uses the result of the hash function to determine if the traffic is passed by that wireless link or is dropped. For broadcast and multicast frames, the hash function is calculated on the source MAC address. Dynamic source MAC rewriting may be performed to prevent port flapping or out-of-order arrival of frames. Establishing one link as a master and communicating among links allows for load balancing and link failure detection.

20 Claims, 2 Drawing Sheets

AGGREGATING MULTIPLE WIRELESS CHANNELS

CROSS-REFERENCES TO RELATED APPLICATIONS

This application claims the benefit of priority and is a Continuation of U.S. application Ser. No. 13/011,708 filed Jan. 21, 2011, now issued as U.S. Pat. No. 8,705,580, which claims priority to U.S. Provisional Application No. 61/297,679 filed Jan. 22, 2010, both of which are hereby incorporated by reference.

BACKGROUND OF THE INVENTION

The present invention relates to digital networks, and in particular, to the problem of extending wired networks using wireless links.

The ubiquity of IEEE 802.11 (WiFi) technology makes it a popular way to implement point-to-point wireless links for Ethernet LAN bridging applications. However the aggregate data rate that can be obtained using 802.11 a/g endpoints over a single wireless channel is less than 30 Mbps. Even with 802.11n links using 40 MHz channels, the aggregate rate is not likely to be higher than 100 Mbps. Given that wired Ethernet speeds exceed 1000 Mbps, there is a need to close the bandwidth gap between wired and wireless links.

A cost effective way of increasing the data rate on the wireless hop is to bond additional wireless links operating on non-overlapping channels. However, simply adding multiple wireless links to bridge between two Ethernet switches may cause problems:

1. Having more than one link between two LAN switches causes a forwarding loop. Most switches will detect this and shut down the ports connected to the redundant links. This defeats the purpose of adding multiple wireless links.

2. More sophisticated switches implement some form of link aggregation where multiple ports can be configured into a link aggregation group (LAG) and the switch will load balance frames across ports in a LAG. If each port in the LAG is connected to a wireless link endpoint, the switch can potentially send frames over all wireless links concurrently, thus increasing throughput. However, there are several reasons why standard Ethernet link aggregation techniques will not work effectively over wireless links.

1. Changing RF conditions can cause the datarate on a channel to fluctuate, rendering the load balancing algorithm on the switch ineffective. A more agile mechanism that reacts to link conditions in real-time is required.

2. Most link aggregation schemes send control packets on each link to detect link failure. Since wireless links can drop frames due to poor RF conditions, the loss of control frames can cause the switch to falsely detect a link failure leading to poor performance. A failure detection scheme that takes into account the fluctuations in the wireless link is needed.

In summary, aggregating multiple wireless links for Ethernet bridging will not work in a majority of situations where the switches do not support link aggregation. In the cases where switches support link aggregation, the load balancing algorithms do not perform well with the dynamically varying bandwidth of the wireless links.

What is needed is a better way to aggregate multiple wireless links for Ethernet bridging.

BRIEF DESCRIPTION OF THE DRAWINGS

The invention may be best understood by referring to the following description and accompanying drawings that are used to illustrate embodiments of the invention in which.

DETAILED DESCRIPTION

Figure 2:
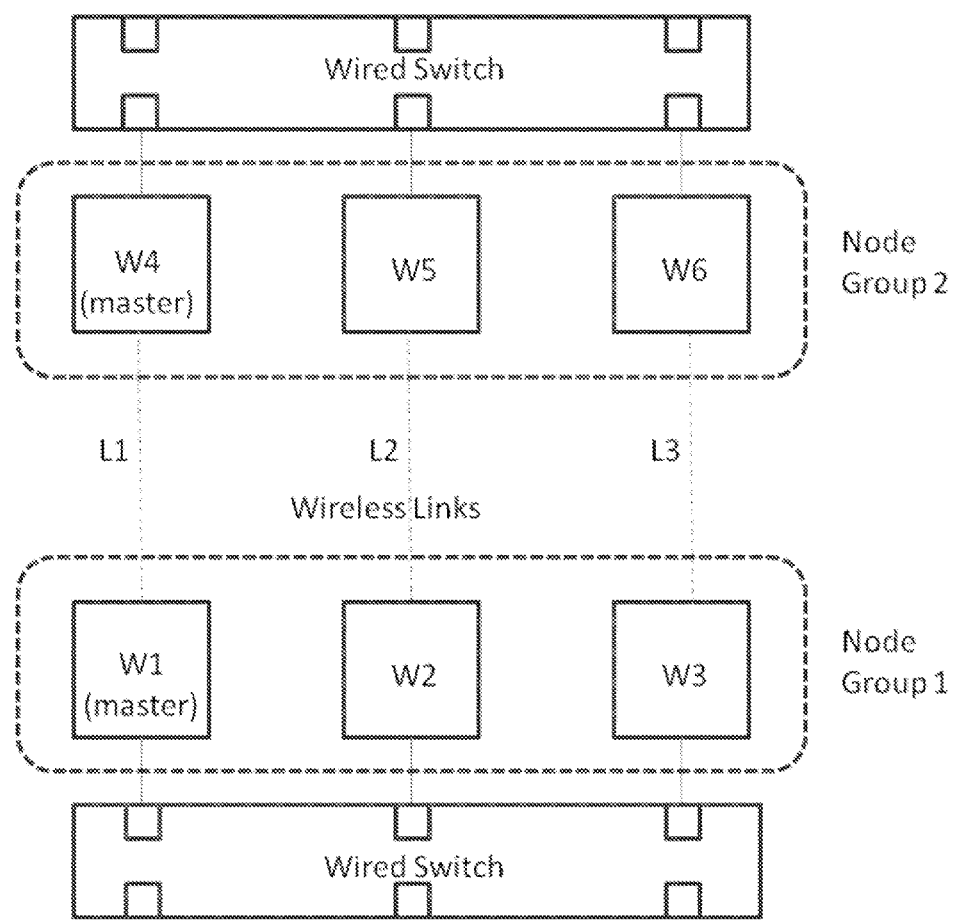
FIG. 2 shows a further view of bridged wired networks.

Embodiments of the invention relate to a system where multiple point-to-point wireless links are used to connect two wired switches. The system consists of software/hardware functions that run on the wireless endpoints of the links and load balance traffic across the wireless links to provide higher overall throughput. Furthermore, the system can react to wireless link failures and bandwidth fluctuations. An example system with three wireless links is shown in FIG. 2.

According to the invention, a hash function calculated on the destination MAC by the wireless link ensures that only one copy of a frame is sent on the wireless hop. As shown in the example below, this prevents forwarding loops that would otherwise occur when multiple links are used to connect two switches. This mapping of destination MAC addresses to wireless links also provides a simple way of load balancing traffic on different links and does not require any coordination with other wireless nodes. An important aspect is to ensure that there is no redundant transmission of frames on the wireless links and no forwarding loops.

According to the invention, for broadcast and multicast frames, the hash function is computed on the source MAC so that only one copy of the frame is sent on the wireless hop and forwarding loops are avoided. This broadcast frame forwarding is key in ensuring that source MAC addresses are learned through the correct ports on the destination switch.

According to the invention, a dynamic source MAC rewriting mechanism insures that even though frames originating from a source arrive on different wireless links, the receiving switch learns the source MAC on a unique port. This prevents MAC addresses in the bridge table of the switch from "flapping" between ports. Preventing such flapping is important because it can cause frames destined to a MAC address to be sent out of different ports and potentially be delivered out of order.

According to the invention, a monitoring and control system operates on wireless nodes on each side of the wireless hop to perform load balancing and link failure detection. Several techniques are used to achieve these goals.

Figure 1:
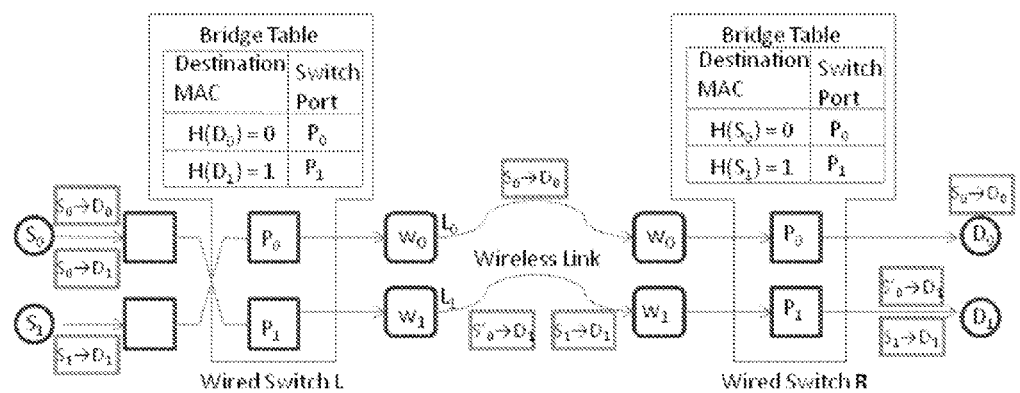
FIG. 1 shows wireless bridging between wired networks.

FIG. 1 illustrates a system with two wireless links connecting two Ethernet switches. As is understood in the art, the wired switches and the wireless link endpoints are purpose-built digital devices, each containing a processor, memory hierarchy, and input/output interfaces. Processors used generally include MIPS class processors, as well as processors from companies such as Cavium, Intel, AMD, and Acorn. The memory hierarchy typically includes fast read-write memory such as DRAM for device operation, and non-volatile memory such as Flash for file storage and device startup. While a simple device such as a basic switch may operate under the control of a dedicated program, more advanced switches and wireless links typically operate under the control of an operating system such as Linux or other real-time capable system.

Switches typically have a plurality of wired interfaces, usually IEEE802.3 wired Ethernet interfaces, connected to a switching fabric and under the control of a processor. Switches are available from manufacturers such as Cisco, Hewlett Packard, and Juniper Networks. Similarly, wireless links have a wired Ethernet interface and one or more radio transceivers, operating under processor control. The wireless links may be specifically designed for use in a bridging application, or may be wireless network access points (APs) repurposed for bridge use.

In FIG. 1, Port P0 of each switch connects to wireless link endpoint W0 and port P1 connects to wireless link endpoint W1. It shows two sources S0 and S1 sending frames to destinations D0 and D1 on the other side of the wireless link. It also shows the bridge table on both the Ethernet switches. Each table entry maps a MAC address to a port. Initially, the bridge table is empty. As is known to the art, when a switch receives a frame on a port, it adds an entry for the source MAC and the input port in its bridge table. If there is no entry for the destination MAC the switch floods the frame on all ports (except the input port).

Consider for example links L0 and L1 and MAC addresses S0, S1, D0, and D1. A hash function M (applied in the wireless link endpoints) takes two arguments: a MAC address 'A' and a link number 'L', and produces a Boolean result i.e. either 1 or 0. Thus $M(A, L)=R$, where $R \in \{0,1\}$. Hash function M answers the question, "Do I pass traffic with MAC address 'A' on wireless link "L"?" This same hash function is implemented on all wireless link endpoints. As an example of a hash function M, treat a MAC address 'A' as an array of 48-bits with indices ranging from 0 through 47. A simple hash function can be defined as $M(A,L)=1$ if $A[40]=L$, and 0 otherwise. Other bits of A may be used, and other hash functions may be used. When $M(A,L)=1$, we say that address 'A' is native to link 'L'.

Note that the hash function must be such that a MAC address is native to exactly one link. In the example of FIG. 1 we have chosen values so that S0 and D0 are native to link L0, and S1 and D1 are native to link L1. This may be performed by hashing the input values (A,L) down to one bit. If four wireless links were used, then a hash function producing two bits from the input A would be used. In general, for m links, the hash function M produces a result modulo m, again selecting one link to be used for address A.

Unicast Destination: Consider the frame S0→D0. Since the bridge table for switch L has no entries, switch L floods the frame on ports P0 and P1 and the frame is received by both W0 and W1. Each node checks if the destination MAC is native to its link Thus W0 calculates $M(D0,0)$ and W1 calculates $M(D0, 1)$. The frame is forwarded on a link only if the hash function returns 1. Since D0 is native to link 0, only W0 will forward the frame across the wireless link, and W1 discards the frame. This ensures that only one copy of the frame is sent on the wireless hop. The frame reaches switch R on input port P0. Since R does not have an entry for D0 in its bridge table, it will also flood the frame on all its ports including P1 (but not on the input port P0). When W1 connected to switch R receives the frame it will apply the same hash function on the destination MAC D0. Since D0 is not native to link 1, W1 will not forward the frame back to switch S. Thus the use of the hash function in the wireless links prevents forwarding loops.

As described, the hash function can be extended to look at multiple bits when there are more than 2 wireless links. Note that the use of the hash function does not require any coordination between wireless nodes to make forwarding decisions. A good hash function will distribute the set of destination MAC addresses evenly across all the links.

Broadcast/Multicast Destination: In this case the switch L sends the frame on ports P0 and P1 and it is received by W0 and W1. W0 and W1 calculate the hash function on the source MAC. The frame is forwarded on the link only if the source MAC is native to the link. Thus if the source MAC of the frame is S0, it is sent only on link L0. This ensures that only one copy of the broadcast frame is sent on the wireless hop. When this frame reaches switch R it is forwarded to port P1 (but not to P0). P1 applies the same hash function on S0 and drops the frame since S0 is not native to link L1. This prevents forwarding loops. An important side effect is that switch R has now learned the source MAC S0 on port P0. In fact, this process ensures that a MAC address Si is always learned on a link Li such that S1 is native to Li.

Consider the frame S0→D1. Since D1 is native to link 1, the frame should be sent by W1 and discarded by W0. This will result in switch R learning the source MAC S0 from port P1. However, this is in conflict with the bridge entry created using the frame S0→D0 in the previous case when R learned S0 on port P0. The solution is to replace (or rewrite) the source MAC of the frame before forwarding on the wireless link.

According to the invention, when forwarding a frame on a link, we also check if the source MAC is native to the link. If the source MAC is native, the frame is forwarded without modification. If not, the source MAC is replaced (rewritten) with a MAC that is native to the link. In this example S0 is not native to link 1 and is replaced with S0'. The choice of S0' must ensure that there is no address duplication, and may be done in many different ways. Recall that according to industry standards a the MAC address comprises an Organizationally Unique Identifier (OUI) which identifies the vendor or manufacturer, followed by an identifier. According to one embodiment of the invention, a different OUI space is used to assign these MAC addresses. Rewriting the source MAC in this way does not cause any problems for IP communication since hosts normally ignore the source MAC in received frames.

According to the invention, the wireless nodes connected to a LAN switch are referred to as a wireless node group. Nodes in a group communicate with each other to implement functions such as dynamic load balancing, failure detection, and ensuring in-order delivery. Typically, nodes in a group either discover other members using a discovery protocol or the group membership information may be configured in each node. Since the nodes are in the same (OSI) Layer 2 domain, they are members of an Ethernet multicast group. Each node periodically sends status information to the group. This also serves as a heartbeat mechanism so that node failures can be detected.

One node in the group is designated as the master for the group. In one embodiment of the invention, the node with the highest (or lowest) MAC address is designated as the group master. Some functions such as failover and load balancing decisions are made by the master. Each node in a group also communicates control messages with its peer node on the other side of the wireless link.

The wireless nodes in a group exchange control messages to implement advanced functions. Both multicast and unicast communication modes are used. In the most general case, each node is an IP endpoint and can communicate with other nodes using the full richness of the IP protocol. From a functional standpoint, full IP connectivity is not strictly required and standard Ethernet (Layer 2) frames suffice to implement both multicast and unicast messaging primitives. Internode communication involves the following aspects:

1. Discovery: Each node must discover other nodes in the group. In the simplest case, discovery is accomplished by having the system administrator configure each node with information about the identity (i.e. MAC address and optionally IP address) of other nodes in the group. Another technique is for each node to broadcast its identity information on a multicast Ethernet address. The multicast address can either be built-in or assigned by the administrator. In any case, each node discovers addressing information of all group members.

2. Mastership: It is convenient to designate a single node in the group as a master. Having a designated master helps in the case when load balancing decisions need to be made. Many approaches may be used to determine which node is the master. In one embodiment, the node with the highest MAC address assumes mastership. If the node acting as master becomes unavailable during operation, the highest MAC address among the remaining nodes assumes mastership.

3. Failure Detection: Each node periodically sends a status message on the multicast group. When the status message from a node fails to arrive for the current interval, it is considered a miss. When the number of consecutive misses exceeds a pre-configured threshold the sending node is declared inactive. Typically, the master will decide what action needs to be taken based on pre-configured policy.

Per-Node State Information: There are two kinds of state information maintained by a node. A node maintains local state information that it gathers and is primarily responsible for. The node communicates its local state to other members of the group as part of its status messages. In addition, a node also holds state information that it has learned from status messages received from other nodes. Over time, this ensures that all nodes converge to the same view of the state information. The state information is organized into several tables.

Source MAC Table: This table (SMAC_TBL) maintains information about the source MAC addresses seen by nodes in the group. Each entry in the SMAC_TBL consists of a MAC address and the "home" node of the MAC. The home node of a MAC is defined as the node anchoring the link to which the MAC is native.

Destination MAC Table: This table (DMAC_TBL) maintains information about the MAC addresses known to be on the other side of the wireless hop. Each table entry consists of a MAC and the ingress node of the MAC. The ingress node of a MAC is the node that receives frames from it's peer that have the MAC address as the source. Note that the source MAC address re-writing scheme described above ensures that each destination MAC has a unique ingress node. In addition, the entry contains the IP address associated with the destination MAC.

Destination MAC Egress Table: This table (EGRESS_TBL) determines the egress node of a destination MAC. When only static load balancing (based on the hash function described in Feature 1) is used, the egress node of a destination MAC is the link/node on which the MAC is native. However, if dynamic load balancing is enabled, the egress node of a destination MAC can be different than the native node. In the case of a node/link failure, the master will determine how the destination MACs served by the failed node will be re-distributed between the remaining operational nodes. The assignment is reflected in the EGRESS_TBL entries.

According to the invention, dynamic load balancing is performed as follows. When an endpoint receives a frame on its wired port, it checks if it is the egress for the destination MAC of the frame. If so, it forwards the frame over the wireless link, otherwise discards it. Note that it is important that each MAC in the EGRESS_TBL has a unique egress, otherwise duplicate transmission of frames can occur. The algorithm used by the master guarantees the uniqueness property.

Avoiding Source MAC Modification: As described above, the source MAC of a frame is rewritten when the source MAC is not native to the link on which the frame is sent. Typically rewriting the source MAC in this way does not cause any problems. In cases where rewriting is not desirable, it can be avoided at the cost of an extra forwarding step on the wired switch at the destination. Assume a frame is received on a wireless link and the source MAC is not native to the link We refer to the receiving node as the ingress node. We refer to the wireless link (or node) for which the source MAC is native as the native link (or node). The ingress node encapsulates the frame as the payload of a control frame and sends it to the native node through the wired switch. The native node extracts the original frame and forwards it to the wired switch. In our example, the frame S0→D1 arrives on L1 with the source address S0 intact. The ingress node W1 detects that S0 is not native based on applying the hash function to S0. W1 identifies the node for which S0 is native which in this case is W0. W1 encapsulates the frame as the payload of a control frame and sends it to the native node W0. W0 extracts the frame S0→D1 and forwards it to the switch which ensures that the address S0 is learned on the correct port. The cost involved in doing this is an extra forwarding operation within the wired switch. For typical wired switches this cost is negligible given the burstiness of data traffic.

When the above mechanism is used and the wired switch does not have a bridge table entry for the destination MAC, the ingress node needs to do some additional work to prevent the frame from being forwarded back to the other side of the wireless hop. Because the destination MAC entry is not present, the destination switch will flood the frame on all ports except the one on which it received it. In our example, W1 will receive the frame and the destination D1 is native to W1. If we just use the hash based forwarding scheme, W1 will end up sending the frame back over the wireless link To prevent this, W1 also needs to look at the source MAC and recognize that it was received over the wireless link and discard it.

Dynamic Load Balancing: The invention provides different methods for dynamic load balancing. We only describe the mechanisms for load balancing and not the policies. The policy determines the assignment of a destination MAC to an egress node and can take into consideration several factors such as the amount of traffic destined to the MAC, administrator determined per-destination priority etc. We assume that the master can be configured to evaluate the egress node assignments periodically or on node/link failures and determine the EGRESS_TBL assignments. The following steps are executed:

1. The master communicates the EGRESS_TBL assignment to all nodes. The message size can be optimized by communicating only the information that has changed since the last update.

2. For each destination MAC that a node has been assigned as the egress node, the node generates a gratuitous ARP request with the destination MAC and IR The frame is addressed to the broadcast MAC and sent to the wired switch port. This has the effect of updating the bridge table of the switch so that it now starts forwarding frames addressed to the destination MAC to the node. After the bridge table in the switch has been updated for all the MACs, normal traffic resumes and is forwarded based on the EGRESS_TBL entries.

As is known to the art, the present invention may be realized in hardware, software, or a combination of hardware and software. The present invention may be realized in a centralized fashion in one computer system, or in a distributed fashion where different elements are spread across several interconnected computer systems associated with the network. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation stored in a nontransitory form, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A computer implemented method, comprising:
   receiving, at a wired network connection of a wireless network device, a network data packet, wherein the network data packet identifies a destination MAC address (media access control address) and a source MAC address, and wherein the wireless network device is associated with a wireless link;
   determining a type of network data packet, wherein types of network data packets include unicast data packets and multicast data packets;
   applying a hash function on a MAC address of the network data packet, wherein the hash function is applied on the destination MAC address when the network data packet is a unicast data packet, and wherein the hash function is applied on the source MAC address when the network data packet is a multicast data packet;
   transmitting the network data packet over the wireless link, wherein the unicast data packet is transmitted when the hash function identifies the destination MAC address as native to the wireless link, and wherein the multicast data packet is transmitted when the hash function identifies the source MAC address as native to the wireless link; and
   discarding the network data packet, wherein the unicast data packet is discarded when the hash function identifies the destination MAC address as non-native to the wireless link, and wherein the multicast data packet is discarded when the hash function identifies the source MAC address as non-native to the wireless link.

2. The method of claim 1, wherein the hash function determines whether a MAC address is native to the wireless link or non-native to the wireless link.

3. The method of claim 1, further comprising:
   rewriting the source MAC address of the unicast data packet with a new source MAC address when the source MAC address of the unicast data packet is non-native to the wireless link, wherein the new source MAC address is native to the wireless link.

4. The method of claim 1, wherein the wireless link is compliant with an IEEE 802.11 specification.

5. The method of claim 1, wherein the wireless link provides wireless connectivity between the wireless device and a corresponding wireless network device.

6. The method of claim 1, wherein the wireless network device is one of a plurality of wireless network devices in a wireless node group, and wherein the plurality of wireless devices are associated with a plurality of wireless links.

7. The method of claim 1, further comprising:
   receiving and transmitting control messages, wherein the control messages facilitate discovery of other wireless network devices in the wireless node group, wherein the control messages facilitate identification of a master wireless network device for the wireless node group, and wherein the control messages facilitate detection of failed wireless network devices in the wireless node group.

8. A system comprising:
   one or more processors;
   a non-transitory computer readable medium communicatively coupled to the one or more processors, the non-transitory computer readable medium including instructions that, when executed by the one or more processors, cause the one or more processors to perform operations including:
   receiving, at a wired network connection of a wireless network device, a network data packet, wherein the network data packet identifies a destination MAC address (media access control address) and a source MAC address, and wherein the wireless network device is associated with a wireless link;
   determining a type of network data packet, wherein types of network data packets include unicast data packets and multicast data packets;
   applying a hash function on a MAC address of the network data packet, wherein the hash function is applied on the destination MAC address when the network data packet is a unicast data packet, and wherein the hash function is applied on the source MAC address when the network data packet is a multicast data packet;
   transmitting the network data packet over the wireless link, wherein the unicast data packet is transmitted when the hash function identifies the destination MAC address as native to the wireless link, and wherein the multicast data packet is transmitted when the hash function identifies the source MAC address as native to the wireless link; and
   discarding the network data packet, wherein the unicast data packet is discarded when the hash function identifies the destination MAC address as non-native to the wireless link, and wherein the multicast data packet is discarded when the hash function identifies the source MAC address as non-native to the wireless link.

9. The system of claim 8, wherein the hash function determines whether a MAC address is native to the wireless link or non-native to the wireless link.

10. The system of claim 8, wherein the instructions, when executed by the one or more processors, cause the one or more processors to perform operations further including:
    rewriting the source MAC address of the unicast data packet with a new source MAC address when the source MAC address of the unicast data packet is non-native to the wireless link, wherein the new source MAC address is native to the wireless link.

11. The system of claim 8, wherein the wireless link is compliant with an IEEE 802.11 specification.

12. The system of claim 8, wherein the wireless link provides wireless connectivity between the wireless device and a corresponding wireless network device.

13. The system of claim 8, wherein the wireless network device is one of a plurality of wireless network devices in a wireless node group, and wherein the plurality of wireless devices are associated with a plurality of wireless links.

14. The system of claim 8, wherein the instructions, when executed by the one or more processors, cause the one or more processors to perform operations further including:

receiving and transmitting control messages, wherein the control messages facilitate discovery of other wireless network devices in the wireless node group, wherein the control messages facilitate identification of a master wireless network device for the wireless node group, and wherein the control messages facilitate detection of failed wireless network devices in the wireless node group.

15. A non-transitory computer readable medium comprising instructions that, when executed by one or more processors, cause the one or more processors to perform operations including:

receiving, at a wired network connection of a wireless network device, a network data packet, wherein the network data packet identifies a destination MAC address (media access control address) and a source MAC address, and wherein the wireless network device is associated with a wireless link;

determining a type of network data packet, wherein types of network data packets include unicast data packets and multicast data packets;

applying a hash function on a MAC address of the network data packet, wherein the hash function is applied on the destination MAC address when the network data packet is a unicast data packet, and wherein the hash function is applied on the source MAC address when the network data packet is a multicast data packet;

transmitting the network data packet over the wireless link, wherein the unicast data packet is transmitted when the hash function identifies the destination MAC address as native to the wireless link, and wherein the multicast data packet is transmitted when the hash function identifies the source MAC address as native to the wireless link; and discarding the network data packet, wherein the unicast data packet is discarded when the hash function identifies the destination MAC address as non-native to the wireless link, and wherein the multicast data packet is discarded when the hash function identifies the source MAC address as non-native to the wireless link.

16. The medium of claim 15, wherein the hash function determines whether a MAC address is native to the wireless link or non-native to the wireless link.

17. The medium of claim 15, further comprising instructions that, when executed by the one or more processors, cause the one or more processors to perform operations including:

rewriting the source MAC address of the unicast data packet with a new source MAC address when the source MAC address of the unicast data packet is non-native to the wireless link, wherein the new source MAC address is native to the wireless link.

18. The medium of claim 15, wherein the wireless link provides wireless connectivity between the wireless device and a corresponding wireless network device.

19. The medium of claim 15, wherein the wireless network device is one of a plurality of wireless network devices in a wireless node group, and wherein the plurality of wireless devices are associated with a plurality of wireless links.

20. The medium of claim 15, further comprising instructions that, when executed by the one or more processors, cause the one or more processors to perform operations including:

receiving and transmitting control messages, wherein the control messages facilitate discovery of other wireless network devices in the wireless node group, wherein the control messages facilitate identification of a master wireless network device for the wireless node group, and wherein the control messages facilitate detection of failed wireless network devices in the wireless node group.

* * * * *